Figure 1:
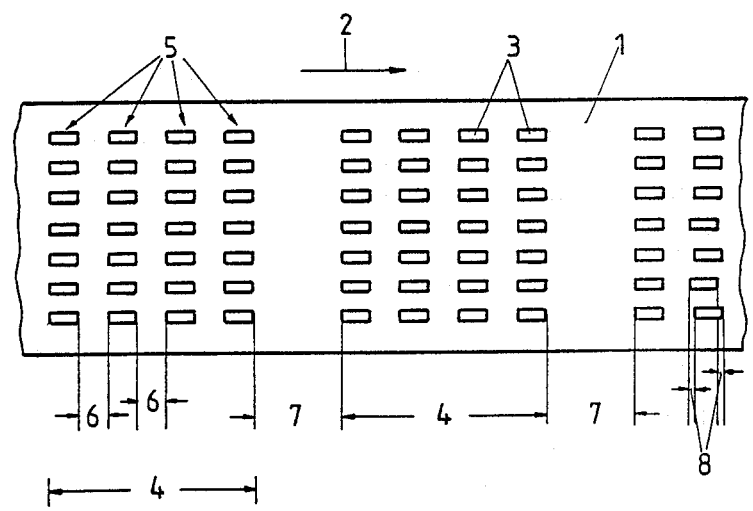

United States Patent [19]

Hogenkamp Wilhelm

[11] Patent Number: 4,960,198
[45] Date of Patent: Oct. 2, 1990

[54] RECIPROCAL CONVEYOR CARRIAGE FOR SPACING GROUPS OF CANDY

[75] Inventor: Hogenkamp Wilhelm, Hanover, Fed. Rep. of Germany

[73] Assignee: Otto Hänsel GmbH, Hanover, Fed. Rep. of Germany

[21] Appl. No.: 362,879

[22] Filed: Jun. 7, 1989

[30] Foreign Application Priority Data

Jun. 7, 1988 [DE] Fed. Rep. of Germany ....... 3819348

[51] Int. Cl.[5] ............................................ B65G 47/31
[52] U.S. Cl. ................................. 198/419.2; 198/461
[58] Field of Search ..................... 198/419.2, 426, 429, 198/460, 461

[56] References Cited

U.S. PATENT DOCUMENTS

| | | | |
|---|---|---|---|
| 3,115,237 | 12/1963 | Atkins | 198/419.2 |
| 4,018,326 | 4/1977 | Hardy | 198/461 |
| 4,155,441 | 5/1979 | Albrecht et al. | 198/419.2 |
| 4,210,237 | 7/1980 | Gram | 198/461 X |
| 4,681,523 | 7/1987 | Thelen | 198/461 X |

FOREIGN PATENT DOCUMENTS

| | | | |
|---|---|---|---|
| 0124071 | 1/1973 | Denmark | 198/419.2 |
| 2509520 | 9/1976 | Fed. Rep. of Germany | 198/461 |
| 2711039 | 9/1978 | Fed. Rep. of Germany | 198/419.2 |

*Primary Examiner*—Joseph Rolla
*Assistant Examiner*—James R. Bidwell
*Attorney, Agent, or Firm*—Max Fogiel

[57] ABSTRACT

A conveyor with one belt (10) that is operated at one speed ($V_1$) and advances pieces of candy (3) distributed in rows (5) at one interval (6) across the direction (2) of travel and with another belt (26) that is operated at a speed ($V_2$) that differs from the first speed and with the rows of candy deposited on it at an interval (7') that differs from the first interval. The facing points (24 and 30) of deflection of the first and second belt are positioned on a driven carriage (15) and create a migrating transfer point. An auxiliary belt (20) is positioned on the carriage between the two deflection points and has a drive mechanism that can be shifted between two auxiliary speeds in accordance with the direction that the carriage is moving in.

12 Claims, 2 Drawing Sheets

RECIPROCAL CONVEYOR CARRIAGE FOR SPACING GROUPS OF CANDY

The invention concerns a conveyor with one belt that is operated at one speed and advances pieces of candy distributed in rows at one interval across the direction of travel and with another belt that is operated at a speed that differs from the first speed and with the rows of candy deposited on it at an interval that differs from the first interval, whereby the facing points of deflection of the first and second belt are positioned on a driven carriage and create a migrating transfer point. Conveyors of this type are employed to receive candy, especially small bars of chocolate from a barrer, and the small pieces of candy are already arriving in groups for example. A group of this type is to be understood in the sense of a field of a number of pieces, with an inter-group interval and an inter-row interval within each group. It is also possible for the inter-group interval to be the same as the inter-row interval, so that the pieces on the first belt can finally only be distinguished row by row. In both cases it is necessary to remove the candy group by group, to transfer it in groups, that is, and supply it alternately to several packaging machines for example. One group can for example consist of four rows of candy, with 25 adjacent pieces in each row.

A conveyor of this type is known from German Patent No. 685 182. It involves in any case, in addition to a series of other belts, two belts with their facing and immediately adjacent deflection points constituting a migrating transfer point in that the deflection points and associated pulleys for the two belts are positioned on a carriage that is driven back and forth paralleling the direction of travel. The second belt travels more rapidly than the first, increasing the candy's inter-row interval due to the difference in speed as the migrating transfer point moves opposite the direction of travel. Strictly speaking, this situation occurs only when the carriage is moving back at a constant speed. If the speed cannot be maintained constant, the inter-row interval on the second belt will also become irregular. To create groups by increasing the interval between two rows that no longer belong to one group, the carriage and the migrating transfer point are moved in the direction of travel at the same speed as the first belt. No row of candy is transferred to the second belt at this time, although the belt is traveling at the comparatively higher speed, creating an inter-group interval, a gap between one group and another, that is. The necessarily present difference between the higher speed of the second belt and the lower speed of the first belt also forces an increase in the inter-row interval within one group, which, however, can be a considerable drawback because for example it is desirable to keep the inter-row interval as small as possible in the downstream chiller in order to exploit the space inside that device to the fullest extent possible. To comply with this requirement it then becomes necessary to position downstream of the second belt a third belt that travels more slowly than the second belt, forcing a decrease in both the inter-row interval and the inter-group interval as the candy is transferred to the third belt. It is impossible in this known device to create groups, to establish a specific inter-group interval, that is, without also increasing the inter-row interval. In other words, the inter-row interval cannot be kept constant while groups are being created. This is because the carriage cannot be moved back at an infinitely high speed, opposite the direction of travel during time zero, that is. It takes a certain minimum time to move the carriage back. It is also difficult to maintain constant speed over the whole path traveled back by the carriage. Usually, the carriage moves more slowly at the beginning and end of the path than when it is more or less at the midpoint. The inter-row interval will accordingly vary, and will specifically be wider at each end of the path than at the midpoint. The inter-row intervals within one group will accordingly no longer be equal.

Another drawback of the known device is that, when the output or speed of the barrer and accordingly of the first belt varies, appropriate adjustments must be made in the speeds of all downstream equipment, specifically the second belt and the subsequent belts, all the way to the mechanisms that transfer the candy to the packaging machines. Although this is extremely complicated, it cannot be avoided because the inter-row interval and the inter-group interval are necessarily interdependent in the known device. The high number of transfer points and also the migrating transfer point as well as the resulting difference in speeds make it highly probable that the pieces of candy in one row will be irregularly aligned, resulting in a certain amount of displacement within the row that is undesirable.

Known equipment for loading packaging machinery and usually positioned in a production line between the conveyor that is the subject of the present and the packaging machine is often designed with pivoting belts to allow the transfer of a particular group of candy to one of two other bands as desired, diverting it to one of two packaging machine. It takes a certain amount of time to pivot such a belt, and that time is what determines the inter-group interval. The inter-group interval must be at least wide enough to allow time to pivot the belt. It is on the other hand practical for the inter-row interval within the group to be relatively narrow so that downstream belts, which must as a rule accommodate at least one group, do not have to be too large.

The object of the invention is to remove candy that arrives in rows and that can also arrive already separated into groups at a prescribed and usually wider inter-group interval without the inter-row interval also necessarily being changed. The conveyor shall in particular be capable of increasing the inter-group interval while maintaining the inter-row interval constant. Displacement of the pieces of candy within a row is also to be avoided as much a possible.

This object is attained in accordance with the invention in that an auxiliary belt is positioned on the carriage between the two deflection points and has a drive mechanism that can be shifted between two auxiliary speeds in accordance with the direction that the carriage is moving in. It is an advantage to drive the auxiliary belt such that it simultaneously constitutes a component or extension of the first belt while the carriage is moving in one direction, against the conveyor's direction of travel, that is, and simultaneously constitutes a component or extension of the second belt while the carriage is moving in the opposite direction, the direction of travel. The auxiliary belt is always shifted back and forth between the two auxiliary speeds once a particular group of candy has been completely accepted by the auxiliary belt or once the auxiliary belt is completely free of candy. The result is that all the candy will be transferred at the same speed at all the transfer points between the belts, ensuring a very reliable transfer in other words, with no displacement worth mentioning within the rows. The new conveyor can handle both continuously supplied candy and candy that has already been separated into groups. It is possible to drive the second belt more rapidly than the first belt in order to increase the inter-group interval and optionally the inter-row interval as well. It is, however, also possible to drive the second belt more slowly than the first belt to narrow the intervals between the candy.

The new conveyor also features the surprising advantage that, even when a supply belt, a barrer, or the first belt changes speed, the situation on the second belt will not change in that the inter-row interval will remain constant within the group and only the inter-group interval will change. If, for example, the first belt decelerates to compensate for some malfunction in the overall system, the conveyor can be operated such as to maintain a constant inter-row interval and increase only the inter-group interval. The wider inter-group interval, however, will in no way be a drawback because, since the downstream packaging-machine loaders operate independently of the inter-group interval, an increasing inter-group interval will not have a deleterious effect on the loaders. What is especially astonishing is that it will no longer be necessary to readjust the packaging-machine loaders and that such readjustments can be completely eliminated when the upstream belts and other equipment change speed. This considerably simplifies the overall system from the aspect of control and regulation expenditure.

There is still another advantage to the new conveyor. There is no longer any interdependence between the inter-row interval within a group and the speed or sequence of speeds at which the carriage moves back. The reason for the independence of speed on the part of the motion of the carriage is that, while the carriage is moving back, the auxiliary belt can be operated at the same speed as the first belt, eliminating any differences in the inter-row interval in the group. When the auxiliary belt is operated at exactly the same speed as the first belt and specifically while the carriage is moving back, it makes absolutely no difference whether the backward motion is uniform or non-uniform or how long it takes. The inter-row intervals will in any case remain constant. When, on the other hand, the auxiliary belt is operated at a slightly different speed than the first belt, the carriage and the auxiliary belt must move opposite the direction of travel as uniformly as possible. Since, however, it is no longer necessary for the backward motion to be as rapid as possible and since there is accordingly enough time, it is comparatively much easier to attain a uniform backward motion.

When the carriage is moving opposite the direction of travel, the auxiliary belt can be operated at an auxiliary speed that equals the first speed of the first belt and, when the carriage is moving in the direction of travel, the auxiliary belt can be operated at an auxiliary speed that equals the speed of the second belt. In this case the inter-row interval will be retained and only the inter-group interval will be changed, usually increased. The inter-row interval is also independent of whether the backward motion is rapid or slow.

The mechanism that drives the carriage back and forth can be synchronized with the inter-row interval on the first belt or with another, further upstream, belt. The synchronization can be established in various ways, by interposing appropriate transmissions for example or even by means of controls that include light barriers, by switching on appropriate electric motors, etc.

To create groups, when the candy is introduced in rows, that is, or to vary the inter-group interval when the candy is introduced already grouped, the advancing strand of the auxiliary belt can be long enough to accept a complete group of candy or a whole-number multiple thereof. Since the advancing strand of the auxiliary belt must as a rule be able to accept only one full group of candy, the inter-group interval, the distance between one group and another, that is, is always constant. When, on the other hand, two groups for example are deposited on the auxiliary belt, there will be two different inter-group intervals.

The back-and-forth motion of the carriage in conjunction with the auxiliary belt can be produced with a cammed drive mechanism, a reversing motor, or a similar mechanism. It is possible to divide the time available for the back-and-forth motion of the carriage in conjunction with the auxiliary belt in various ways between the forward motion and the backward motion in accordance with the desired result. It is for example possible to divide the time up with reference to the direction of travel and the speed of the first belt such that the masses of the carriage and of the auxiliary belt will have to be accelerated only comparatively little. In other words, it is practical for the carriage and the auxiliary belt to move back and forth not all that rapidly.

The point of departure for the method of advancing pieces of candy distributed next to one another in rows across the direction of travel and of establishing an inter-group interval in accordance with the invention is that the candy is transferred row by row from one belt that is operated at one speed to another belt that is operated at a speed that differs from the first speed. The difference in speed that occurs during the transfer results at the state of the art in a displacement within the rows that derives from differences in the shape of the bottom surfaces of the candy and in the design of the points of transition. The displacement has a detrimental effect on the downstream machinery. To prevent this displacement while retaining the possibility of varying the inter-group interval and still maintain a constant inter-row interval for example, the rows are initially transferred from the first belt to an auxiliary belt that is operated during the transfer at the speed of the first belt. Once the group has been transferred to the auxiliary belt, the belt is accelerated to the speed of the second belt and that speed is maintained while the group is transferred to the second belt. This procedure ensures that the candy will be transferred at each point only while the receiving belt is being operated at the same speed as the releasing belt. Since, accordingly, the speed at the point of transfer is not altered at that instant but is constant and uniform, there will be no displacement within the row. The auxiliary belt on the other hand is accelerated from the speed of the first belt to the speed of the second belt only once a complete group of candy is on the auxiliary belt or once the auxiliary belt is completely free of a group of candy.

The auxiliary belt can move opposite the direction of travel while it is receiving a group and in the direction of travel while it is releasing a group. This is an advantage when the candy arrives on the first belt at a narrow inter-group interval or even in an uninterrupted series of rows, at an inter-group interval that equals the inter-row interval, that is, and it is still desirable to prevent the difference between the speed of the first belt and that of the second belt and the inter-group intervals from becoming excessive, as is necessary in many situations. This characteristic is especially significant in conjunction with the different speeds at which the auxiliary belt is operated.

The inter-group interval can be varied by varying the ratio of the timing of the auxiliary belt as it moves opposite the direction of travel to the timing of the auxiliary belt as it moves in the direction of travel. It accordingly becomes possible to handle different types of candy in different ways in one and the same system. The times can be distributed in any practical way, and the length advanced by the auxiliary belt will be derived therefrom.

The speed of the second belt can be maintained constant even when that of the first belt is varied. The rate at which the candy leaves the barrer will often vary. The speed of the first belt is generally derived from the rate at which the barrer processes or releases the candy and is synchronized with it. At the state of the art it is accordingly necessary to also synchronize the speed of the second belt with the rate of the barrer. This synchronization must also include all downstream belts, processing machinery, packaging machinery, etc. The method in accordance with the invention, however, makes it possible for the first time to select any speed for the second belt without having to synchronize it and accordingly ensure the minimum inter-group interval on the second belt that will be sufficient for operating the downstream processing machinery even when the first belt is operating at maximum speed. When, accordingly, variations in the rate of operation of the barrer dictate an acceleration or deceleration of the first belt, the result will be only a relative increase in the inter-group interval, whereas the inter-row interval will remain constant. Increasing the inter-group interval beyond a minimum, however, will generally have no detrimental effect on the downstream machinery.

The speeds that the auxiliary belt is operated at can be synchronized with the speeds of the first and second belt to ensure identical speeds at the point of transfer every time the candy is transferred. The times during which the first or second speed is maintained can govern the change in the inter-group interval while maintaining the inter-row interval constant.

Figure 4:
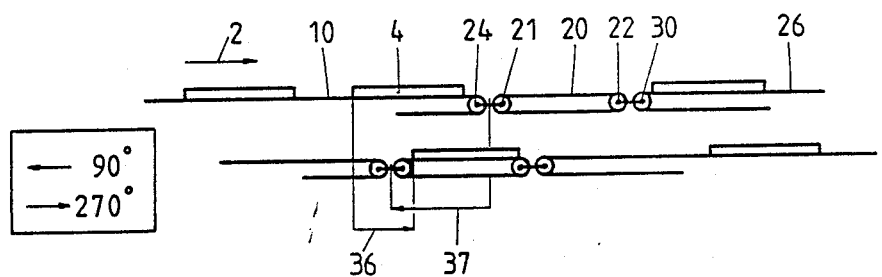
Figure 5:
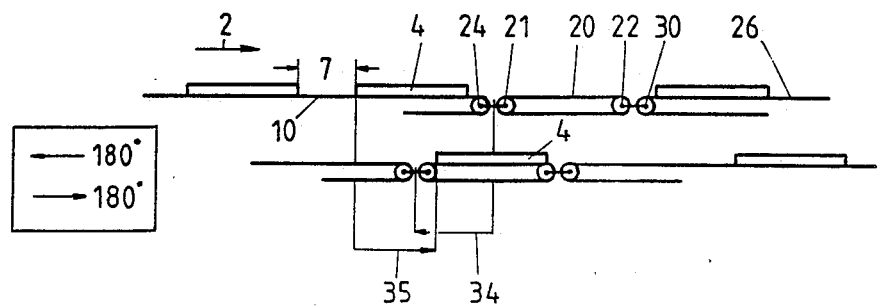
Figure 2:
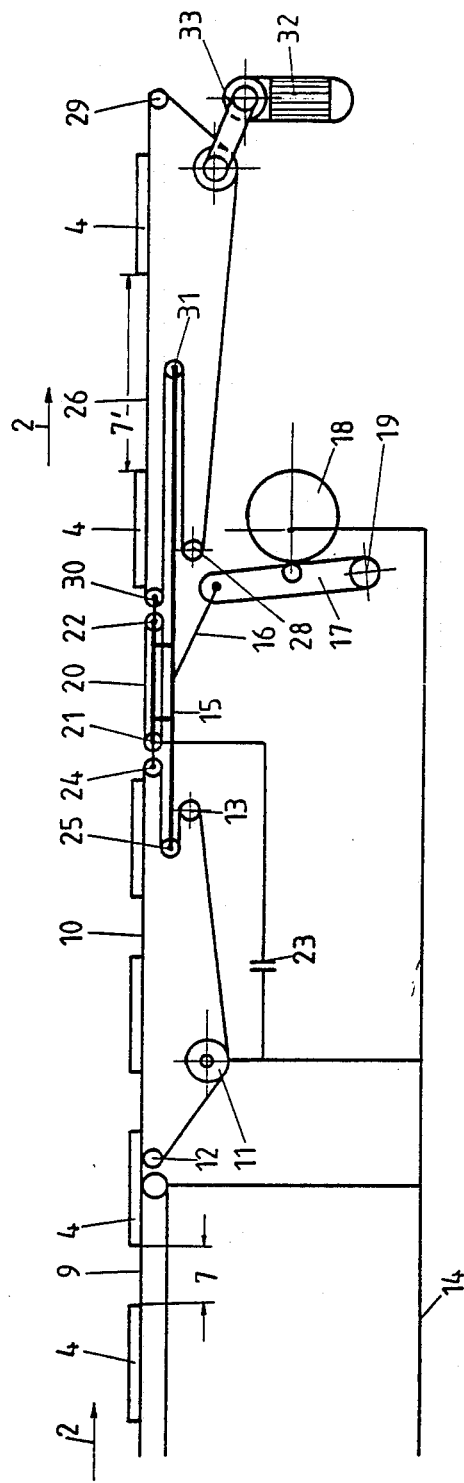
Figure 3:
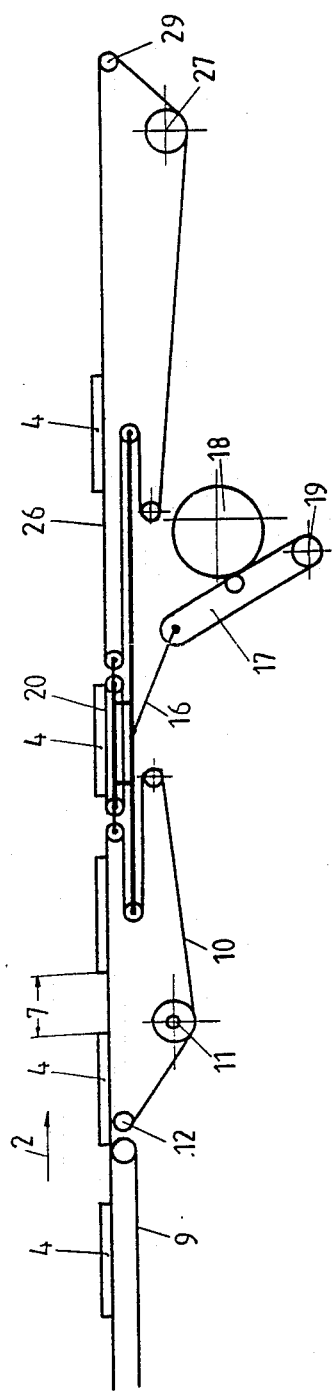

The invention will now be described with reference to the schematic drawings, wherein FIG. 1 is an incomplete top view of candy on a conveyor belt, FIG. 2 is a schematic side view of the conveyor with the auxiliary belt in the frontmost position, FIG. 3 is a schematic side view of the conveyor with the auxiliary belt in the rearmost position, FIG. 4 is a schematic representation of the essential component of the conveyor with the timing of the two states illustrated in FIGS. 2 and 3 distributed in one relationship, and FIG. 5 is a representation like FIG. 4 but with a difference time distribution.

FIG. 1 is a top view of part of a conveyor belt 1 that advances in the direction 2 indicted by the arrow. Distributed in an area along belt 1 and specifically in groups 4 are pieces of candy 3, each group consisting perhaps of four rows 5 of seven adjacent pieces. Between the adjacent rows 5 within each group 4 is an inter-row interval 6, and between the last row 5 of each group 4 and the first row 5 of the following group 4 is an inter-group interval 7. FIG. 1 illustrates these terms and how candy 3 is distributed on the wide range of belts 1 in a processing system. It will be evident that inter-row interval 6 can equal inter-group interval 7, in which case it is impossible to distinguish between the groups, and the rows emerge from a barrer or other device only at inter-row interval 6. If a row 5 of candy 3 is not completely straight across direction 2 of travel, there will exist an in-row displacement 8, representing the extent to which the front or rear of the pieces of candy 3 are shifted along direction 2 of travel.

FIG. 2 illustrates the essential components of the conveyor. The groups 4 of candy might emerge from an unillustrated barrer at inter-group interval 7. The conveyor downstream of a belt 9 has an initial belt 10 operated at an initial speed $v_1$. First belt 10 is wrapped around a drive pulley 11 and two stationary deflection pulleys 12 and 13. Since the mechanism is driven by a transmission 14 that leads to both the pulley 11 that drives first belt 10 and to belt 9, both belts are operated at the same speed, which can be varied in accordance with the variable rate at which the barrer is operated.

At the end of first belt 10 is a carriage 15 that slides both in and opposite to direction 2 of travel, executing a back-and-forth motion. This motion is generated by a transmission that has levers 16 and 17 and an eccentric cam 18. Lever 17 pivots around a stationary bearing 19 at an angle dictated by the particular position of cam 18, which it rests against. Lever 16 is articulated to the free end of lever 17 and also engages carriage 15. Transmission 14 also drives cam 18, synchronizing the back-and-forth motion of carriage 15 with the rate of the barrer or with the initial speed $v_1$ of first belt 10. Wrapped around two pulleys 21 and 22 on carriage 15 is an auxiliary belt 20 that can be operated at at least two different speeds. The mechanism that drives auxiliary belt 20 can for example be engaged by either drive pulley 11 or transmission 14 by way of a schematically illustrated coupling 23. Mounted on carriage 15 are two other deflection pulleys 24 and 25, around which first belt 10 is wrapped in the illustrated loop, creating at the transition from deflection pulley 24 to pulley 21 a point of transfer from first belt 10 to auxiliary belt 20 that migrates as carriage 15 moves back and forth. The utilizable length of auxiliary belt 20 remains constant, whereas that of first belt 10 increase and decreases.

Downstream of auxiliary belt 20, another conveyor belt 26 is wrapped around a drive pulley 27 and two stationary deflection pulleys 28 and 29. Here again two deflection pulleys 30 and 31 are mounted on carriage 15 and belt 26 is looped around them, creating between auxiliary belt 20 and belt 26 another point of transfer that migrates between pulley 22 and deflection pulley 30. Obviously, the pulleys in the plane of conveyance can also constitute deflection edges to keep the free section in the vicinity of the transfer points as short as possible. Second belt 26 is operated at a speed $v_2$ that is higher than the speed $v_1$ of first belt 10. Second belt 26 can be driven by a motor 32 by way of a transmission 33 that transmits the power to drive pulley 27. It is an advantage for the speed $v_2$ of second belt 26 to be maintained constant during the operation, even when speed $v_1$ varies during the processing. Whereas the groups 4 on belts 9 and 10 have or can have an inter-group interval 7, which may also equal inter-row interval 6, the inter-group interval 7' on second belt 26 is comparatively wider, although the inter-row interval 6, which is not illustrated, within each group 4 remains constant. This means that group 4 will as a group remain intact as it travels through the conveyor.

FIG. 2 might be considered to illustrate the frontmost point of reversal of carriage 15, a point at which first belt 10 has the longest and second belt 26 the shortest utilizable length. It is important to realize that auxiliary belt 20 is free of groups 4 or candy 3 and that the last group 4 has already been transferred to second belt 26. FIG. 3 on the other hand illustrates the rearmost point of reversal of carriage 15, which occurs for example once cam 18 has rotated another 180°, whereupon first belt 10 is at its shortest and second belt 26 at its longest length. While carriage 15 is traveling backward, opposite to direction 2 of travel, auxiliary belt 20 is advanced in direction 2 of travel, by way of coupling 23 for example, long enough at the speed $v_1$ of the first belt for the next group 4 to be completely transferred from first belt 10 to auxiliary belt 20. Since first belt 10 and auxiliary belt 20 are also operated at the same speed in the vicinity of deflection pulleys 24 and 21, neither an in-row displacement 8 nor a change in either inter-row interval 6 or inter-group interval 7 will occur where the candy 3 in group 4 is transferred to auxiliary belt 20. Auxiliary belt 20 does not absolutely have to be started operating at speed $v_1$ where carriage 15 reverses its motion. It should for practical purposes, however, start approximately and not much later than when carriage 15 begins to move back. This also applies to terminating the operation of auxiliary belt 20 at speed $v_1$. During this motion, at the transition between FIGS. 2 and 3, that is, the groups 4 on first belt 10 are advancing in the direction of travel and carriage 15 is moving opposite to that direction. It will be evident that carriage 15 must move to comparatively less than the length of a group 4 to completely transfer the group 4 to auxiliary belt 20. The backward motion of carriage 15 in opposition to direction 2 of travel might for example be governed by half, 180°, of cam 18. The other half, the next 180°, of cam 18 will accordingly govern the motion of carriage 15 in direction 2 of travel. This transition will also be evident from comparing FIGS. 3 and 2. While carriage 15 is moving in direction 2 of travel, auxiliary belt 20 will also be operated in the same direction for a certain length of time, although at the speed $v_2$ of second belt 26, to allow candy 3 to be transferred, again without any in-row displacement 8, by way of deflection pulleys 22 and 30. Since, however, the group 4 on auxiliary belt 20 will now suddenly be moving to the right at speed $v_2$, which is too high for the next group 4 on first belt 10 to follow, inter-group interval 7 will increase to inter-group interval 7' with no change in inter-row interval 6. Since practically any speed $v_2$ can be selected for second belt 26, the attainable inter-group interval 7' can also be established. Speed $v_2$ is preferably maintained constant for one application. Once the maximum permissible speed $v_{1max}$ of first belt 10 has been established, inter-group interval 7' will be at a minimum and must accordingly never be exceeded. If the barrer changes its speed $v_1$ during the operation, inter-group interval 7' will also change, increasing when speed $v_1$ decreases relative to speed $v_{1max}$ and accordingly always remaining wider than a minimum inter-group interval 7'. Minimum inter-group interval 7' is established to comply with the requisites of any downstream processing and packaging systems and of any belts downstream of belt 2. An increased inter-group interval 7' will accordingly have no detrimental effect while speed $v_1$ is decreasing because the inter-row interval will again remain constant, and the appearance of group 4 will not change. It is a particular advantage that the mechanism that drives second belt 26 (and those that drive all downstream belts and other components) does not have to be synchronized with transmission 14 in relation to speed $v_1$. The result is considerable savings of controls. The mechanism that drives auxiliary belt 20 must of course be capable of being synchronized in some way with the speed $v_2$ of second belt 26 while carriage 15 is moving forward. One of skill in the art will however have appropriate means available, electric synchronization for example.

The conditions concomitant to division of cam 18 into 180° for the backward motion and 180° for the forward motion of carriage 15 were described with reference to FIGS. 2 and 3 and are schematically illustrated once again in FIG. 5, with belts 10 and 26 and auxiliary belt 20 being represented even more simplified. The upper illustration is in principle the same as FIG. 2 and the bottom illustration the same as FIG. 3. The auxiliary belt 20 in the upper illustration is empty. During the transition to the lower illustration, the auxiliary belt has advanced backward, opposite to direction 2 of travel, to an extent 34, and the rear of each piece of candy 3 in the last row 5 of group 4 has simultaneously traveled in direction 2 of travel to an extent 35. As will be evident, the whole group 4 of candy 3 has been transferred to auxiliary belt 20 with no change in either inter-row interval 6 or inter-group interval 7. Obviously, extents 34 and 35 are of the same order of magnitude. It will also be apparent that there is enough time to allow auxiliary belt 20 to accept the complete group 4 while carriage 15 is moving backward. There is on the other hand also enough time for auxiliary belt 20 to release a complete group 4 to second belt 26. The times at which auxiliary belt 20 begins to operate at speeds $v_1$ and $v_2$ can be varied to establish the width of inter-group interval 7 or 7'.

FIG. 4 illustrates another way of dividing the circumference of cam 18. Only ¼ of the circumference of cam 18, 90°, now governs the backward motion of carriage 15 opposite to direction 2 of travel. Since only a comparatively short time is available for carriage 15 to move backward and since the group 4 on first belt 10 can travel only a shorter extent 36 during that time, carriage 15 must move backward to a longer extent 37 and hence more rapidly. The extent 35 in FIG. 5 can be considered more or less twice the extent 36 in FIG. 4 in this case, assuming that the speeds $v_1$ in FIGS. 4 and 5 are the same. The advantage of the embodiment illustrated in FIG. 4 is that, since approximately 270° is available along the circumference of cam 18 to move carriage 15 forward, there is a lot of time available for transferring a group 4 of candy 3 to second belt 26. This shows how the division of the circumference of cam 18 can be optimally exploited in conjunction with the division of the back-and-forth motion of carriage 15 in accordance with a particular application. It will also be evident that one cam 18 can be simply replaced with another cam 18 with a different circumferential division to adjust the conveyor to different situations. Furthermore, speed $v_2$ can also of course be varied in relation to speed $v_1$ to suit different systems.

I claim:

1. A conveyor comprising: a first belt operated at a first speed for transporting candy pieces distributed in first rows spaced from each at a predetermined first interval, said first rows extending transverse to the direction of motion of said first belt; a second belt operated at a second speed differing from said first speed for transporting candy pieces distributed in second rows spaced from each other by a predetermined second interval variable in relation to said first interval; a driven reciprocable carriage, said first belt and said second belt having facing reverse deflecting sides positioned on said carriage and forming a migrating transfer location; a third auxiliary belt on said carriage between said two deflecting sides and having drive means shiftable between two auxiliary speeds dependent on the direction of motion of said carriage; said first rows of candy pieces on said first belt being arranged in first groups of rows, adjacent groups of said first groups of rows being separated by a first distance; said second rows of candy pieces on said second belt being arranged in second groups of rows, adjacent groups of second groups of rows being separated by a second distance that is greater than said first distance; said drive means operating said auxiliary belt at said first speed for transfer of said first groups to said auxiliary belt, said drive means operating said auxiliary belt thereafter at said second speed for transfer said groups on said auxiliary belt to said second belt.

2. A conveyor as defined in claim 1, wherein said auxiliary belt is operated at an auxiliary speed equal to said first speed of said first belt when said carriage moves opposite to the direction of motion of said first belt, said auxiliary belt being operated at an auxiliary speed equal to said second speed of said second belt when said carriage moves in the direction of motion of said first belt.

3. A conveyor as defined in claim 1, including drive means for driving said carriage back and forth, said drive means being synchronized with said first interval on said first belt.

4. A conveyor as defined in claim 1, including a fourth upstream belt; drive means for driving said carriage back and forth, said drive means being synchronized with said fourth upstream belt.

5. A conveyor as defined in claim 1, wherein said auxiliary belt has a length sufficient for accepting at least one complete group of candy pieces to vary said second distance.

6. A conveyor as defined in claim 1, including drive means for driving said carriage back and forth.

7. A conveyor as defined in claim 6, wherein said drive means comprises a cammed drive means.

8. A method for transporting candy pieces, comprising the steps: distributing candy pieces on a first belt in first rows spaced from each other at a predetermined first interval, said first rows extending transverse to the direction of motion of said first belt; operating said first belt at a first speed; operating a second belt at a second speed differing from said first speed; distributing candy pieces on said second belt in second rows spaced from each other by a predetermined second interval variable in relation to said first interval; driving a carriage reciprocably to form a migrating transfer location, said first belt and said second belt having facing reverse deflecting sides positioned on said carriage; driving a third auxiliary belt on said carriage between said two deflecting sides at two auxiliary speeds dependent on the direction of motion of said carriage; arranging said first rows of candy pieces on said first belt in first groups of rows and separating adjacent groups of said first groups of rows by a first distance; arranging said second rows of candy pieces on said second belt in second groups of rows and separating adjacent groups of said second groups of rows by a second distance that is greater than said first distance; transferring said first groups of rows from said first belt to said third auxiliary belt while operating said auxiliary belt at a speed substantially equal to said first speed; adjusting the speed of said auxiliary belt thereafter to equal substantially said second speed; and transferring the groups of candy pieces from said auxiliary belt to said second belt while maintaining the speed of said auxiliary belt equal substantially to the speed of said second belt.

9. A method as defined in claim 8, wherein said auxiliary belt is movable opposite to the direction of travel of said first belt when receiving a group of candy pieces from said first belt, said auxiliary belt being movable in the same direction as the direction of travel of said first belt when releasing a group.

10. A method as defined in claim 8, including the step of varying a ratio of timing of said auxiliary belt for varying said second distance when said auxiliary belt moves opposite to the direction of travel of said first belt, said timing being also varied when said auxiliary belt moves in the direction of travel of said first belt.

11. A method as defined in claim 8, including the step of maintaining the speed of said second belt constant even when the speed of said first belt is being varied.

12. A method as defined in claim 11, including the step of operating said auxiliary belt at speeds synchronized with speeds of said first belt and said second belt to obtain identical speeds at a location where said candy pieces are transferred.

* * * * *